Patented July 10, 1945

2,380,246

UNITED STATES PATENT OFFICE 2,380,246

PREPARATION OF AROMATIC NITROCOMPOUNDS

Max C. Knake, Washburn, Wis., assignor to E. I. du Pont de Nemours & Company, Wilmington, Del., a corporation of Delaware No Drawing. Application January 4, 1940, Serial No. 312,354

7 Claims. (Cl. 260—645)

This invention relates to aromatic nitrocompounds such as trinitrotoluene, particularly with respect to a novel method for crystallizing trinitrotoluene in a form which facilitates operation as well as increasing the general efficiency of manufacture of this material.

The commonly employed method of producing such materials involves production of the crude aromatic nitrocompound by the use of acids in a manner which does not cause loss of the aromatic nitrocompound by dissolution. The crude material contains isomers which are undesirable and consequently must be removed if a pure product is essential. Frequently this is done by reducing the material to a finely divided state and then treating with an aqueous solution of an alkaline sulfite.

Heretofore it was felt that the efficacy of the purification treatment depended on the reduction of the material to a finely divided and permeable condition. Thus, trinitrotoluene was obtained in the form of fine, flaky crystals, in order that the maximum surface would be available to the action of the alkaline sulfite solution which dissolved the undesirable beta and gamma isomers present on the surface of the fine crystals. Although this procedure potentially yields a trinitrotoluene of considerable purity, the complete elimination, in a practicable manner, of the spent sulfite liquor from the fine, flaky crystals presented a serious problem. As a result, it has been necessary to resort to means which are considered rather hazardous for use in conjunction with explosive compounds, for example the use of a centrifuge.

Although various efforts have been made to obviate this difficulty of separation of the alkaline sulfite solution, none has been wholly satisfactory. One method which has been tried involved pelleting the crude trinitrotoluene by pouring it in a molten state into cold water. This procedure is objectionable because the pellets formed occlude the undesirable isomers so that substantial elimination of these by known purification methods cannot be effected.

The object of the present invention is a novel method for producing substantially pure aromatic nitrocompounds. Another object is the production of crude trinitrotoluene in a form which can be purified readily and safely. A further object is the formation of crystals of aromatic nitrocompounds which permit facile separation of solution therefrom. Still further objects will appear as the invention is described more fully hereinafter.

The foregoing objects are attained by the process of my invention which comprises forming a mixture of the molten crude aromatic nitrocompound with water, cooling said mixture to gradually crystallize said aromatic nitrocompound, the mixture being gradually cooled until crystallization is substantially complete, and then shocking the crystal-containing charge by cooling suddenly. The terms "shocking" or "shocked" are employed to denote the force or strain exerted within the crystal structure which occurs upon a sudden change in temperature. These terms are employed in this sense throughout the specification and claims. This shocking of the crystals apparently causes them to contract so that any loose aggregates of crystals are broken up into the individual crystals. After the shocking step, the crystals are treated with an alkaline sulfite solution to remove the isomers therefrom. The temperature of the charge is still sufficiently high after the shocking step to permit very effective removal of said isomers in the sulfite step.

It is important to note that the crystals prepared according to the foregoing process are coarse and needle-shaped, so that the alkaline sulfite solution used for dissolution of the undesirable isomers can be separated from the crystals quite readily, with only a minimum of the spent sulfite liquor retained by the crystals.

A preferred embodiment of the invention comprises intermingling molten crude trinitrotoluene with a somewhat lesser volume of hot water, the temperature of this mixture being about 80° C. The mixture, while being agitated vigorously, is cooled by adding thereto water in the form of a plurality of sprays, the rate of addition of the water being below that which would cause localized solidification of the trinitrotoluene. The addition is continued until the trinitrotoluene has been supercooled to the temperature at which crystallization begins, say at about 71° C. The rate of addition of water is then decreased to the point where the rate of cooling is somewhat less than the heat evolved by the crystallization of the trinitrotoluene. This slow cooling during the crystallization period causes the formation of coarse, needle-shaped crystals. Actually, it is possible to eliminate the addition of cold water during this period, allowing the charge to be crystallized by atmospheric cooling, but such procedure may require a substantial period of time. After crystallization is substantially complete, the charge then having a temperature of say 72° C., sufficient water to reduce the temperature to approximately 60° C. is quickly added thereto. This sudden cooling, as stated hereinbefore, shocks the crystalline aggregates, causing division into the individual crystals. All the foregoing steps are effected while the charge is being agitated.

The charge may now be accorded the alkaline sulfite treatment in known manner, although it is preferred to control the pH of the sulfite solution as disclosed by U. S. Patent No. 2,132,845, issued to Castner and Knake. Treatment with the alkaline sulfite solution at a temperature of about 60° C. has proved to be quite efficient. Of course, it is possible to effect this treatment at lower temperatures if more convenient, but decrease in temperature requires a longer reaction period.

After the sulfite treatment the slurry may be passed through a screen, which separates any aggregates which may not have been broken up by the shocking treatment. This step may be referred to as the "depelleting" step. The solution of spent sulfite solution is then removed, as by screening, filtering, or the like, the solution adhering to the crystals being eliminated by washing. The ease with which substantially complete elimination of alkaline sulfite can be effected is quite surprising in view of the difficulty experienced in this connection when crystals of trinitrotoluene were produced in accordance with methods employed heretofore. Thus, the spent sulfite solution may be removed by passing the trinitrotoluene crystals onto a dewatering screen and washing said crystals with several water sprays while being passed over the screens. After being washed, the damp crystals are melted to remove moisture and are formed into dry grains by well-known methods.

In order to describe the invention more in detail, reference is made to the following examples which of course are cited as specific embodiments and are not intended as limiting the invention.

Example 1

An emulsion composed of 800 pounds of impure molten trinitrotoluene and 53 gallons of water was agitated vigorously by mechanical means, the temperature of said emulsion being 76° C. While continuing the agitation, water at a temperature of 10° C. was added to the mixture, said water being added in the form of fine sprays distributed over substantially the entire surface of the charge. The temperature of the charge dropped to about 71.0° C., at which temperature the trinitrotoluene began to crystallize. The rate of water addition was then so regulated that the temperature of the charge rose to a maximum of 72.8° C. due to the heat of crystallization, and then slowly decreased to 72.0° C., at which temperature the trinitrotoluene separated from the water in the form of crystalline agglomerates. A 6-minute interval existed between the start of crystallization and the point at which the trinitrotoluene separated out as crystals, 12 gallons of water being employed to cool the charge from its original temperature to the stage of separation. Once this latter stage had been reached, the crystals were shocked by the rapid addition of sufficient cold water to lower the temperature to 57° C. Separation of the aggregates of crystals into individual crystals was then substantially complete.

This charge of trinitrotoluene crystals, when treated in known manner with a solution of sodium sulfite, yielded a material having a freezing point of 80.34° C., which indicates that the finished product was substantially pure.

Example 2

3000 pounds of crude trinitrotoluene having a freezing point of 77.5° C. and 250 gallons of hot water were formed into an emulsion by agitating vigorously, the resulting emulsion having a temperature of 79.5° C. The charge was then cooled by means of air drawn through the container by means of suction applied to the stack thereof. After 10 minutes the temperature of the charge had dropped to 71.5° C., at which point the trinitrotoluene began to crystallize. Cooling by means of air was continued at such rate that the maximum temperature attained as a result of the heat of crystallization was 73.0° C., said temperature gradually decreasing to 72.2° C., at which point aggregates of crystals of trinitrotoluene separated out. The time interval between the start of crystallization and the separation of the trinitrotoluene from the emulsion was 16 minutes.

The aggregates of crystals were then shocked by adding rapidly 220 gallons of cold water, the addition of this water causing the temperature to drop to 60.0° C. The aggregates had now broken down to individual crystals of trinitrotoluene, said crystals being coarse and of needle-shaped form. These coarse, needle-shaped crystals were then treated with a solution of sodium sulfite of controlled pH value, and the adhering sulfite solution was removed by passing over a screen while washing with sprays of water. The finished trinitrotoluene had a freezing point of 80.30° C.

It will be seen from the foregoing description that my invention discloses a method for crystallizing aromatic nitrocompounds, characterized by safety and ease of operation, without entailing the use of complicated and expensive equipment. In fact, the equipment is greatly simplified over conventional equipment in this industry by the process of my invention. Moreover, the crystals formed in accordance with my invention not only may be purified to the optimum degree by the use of alkaline sulfite solutions, but also permit facile elimination of the purifying solution therefrom.

In the foregoing I have described my invention in connection with the actual manufacture of aromatic nitrocompounds, in particular trinitrotoluene. I intend, however, that my invention shall include likewise the application of my process to salvaged nitrocompounds, for example, trinitrotoluene, which has been removed from shells and the like.

It will be evident to those skilled in the art that the foregoing procedure permits of variations without departing from the spirit or scope of the invention. Thus, it is conceivable that the requisite control in the cooling of the charge may be attained by media other than sprays of water, or by means of air. Likewise, cooling or heating, such as may be requisite for temperature control, may be applied in part at least by passing the cooling or heating media through a jacket about the container for the charge. I intend, therefore, to be limited only in accordance with the following claims.

I claim:

1. A method of producing crystalline trinitrotoluene in a form readily adapted to purification treatment, which comprises forming a mixture of the molten crude aromatic nitrocompound and water, cooling said mixture to the temperature at which crystallization of said aromatic nitrocompound commences, the rate of cooling during this decrease in temperature being insufficient to cause localized freezing of the aromatic nitrocompound, controlling the crystal growth by regulating the cooling rate during the interval between the start of crystallization and a point at which the crystallization is substantially complete, and shocking the crystals by cooling said charge more than 5° C. and quickly by introducing thereinto an excess of cold water.

2. A method of producing crystalline trinitrotoluene in a form readily adapted to purification treatment, which comprises forming a mixture of molten crude trinitrotoluene and water, cooling said mixture until crystallization of the trinitrotoluene commences, controlling the growth of the crystals by regulating the rate of cooling during the interval between the initiation of crystallization and a point at which the crystallization of said trinitrotoluene is substantially complete, and then shocking the crystals formed by quickly cooling the charge more than 5° C. with an excess of cold water, agitation of the charge being effected throughout the various steps of the process.

3. A method of producing crystalline trinitrotoluene in a form readily adapted to purification treatment, which comprises cooling a mixture of molten crude trinitrotoluene and water until crystallization of the trinitrotoluene commences, controlling the growth of the crystals by regulating the rate of cooling during the interval between the start of the crystallization and the point where crystallization of the trinitrotoluene is substantially complete, said cooling being effected by adding water to the charge, and shocking said crystals by quickly cooling the charge more than 5° C. with an excess of cold water, said charge being agitated throughout the various steps.

4. A method of producing crystalline trinitrotoluene in a form readily adapted to purification treatment, which comprises cooling a mixture of crude molten trinitrotoluene and water by the addition of water thereto, the rate of addition being insufficient to cause localized freezing of the trinitrotoluene, said cooling being continued until the molten trinitrotoluene starts to crystallize, controlling the growth of the crystals by adjusting the rate of cooling until crystallization of the trinitrotoluene is substantially complete, and shocking the trinitrotoluene crystals by cooling quickly more than 5° C. with an excess of cold water, agitation of the charge being effected during the various steps.

5. A method of producing substantially pure trinitrotoluene, which comprises cooling with agitation a mixture of crude molten trinitrotoluene and water to a temperature between 68 and 74° C., continuing the cooling at a low rate while the temperature of the charge remains at least 68° C., shocking the crystals formed by adding sufficient cold water to reduce the temperature quickly to about 60° C., agitating this slurry with an alkaline sulfite solution, and removing the sulfite solution from the crystals by screening and washing with water.

6. A method of producing substantially pure trinitrotoluene, which comprises forming a mixture of crude molten trinitrotoluene and water, cooling by adding cold water until crystallization of the trinitrotoluene commences, regulating the addition of water so that the charge exhibits a slight increase in temperature, due to heat of said crystallization, after crystallization is substantially complete shocking the crystals by cooling the charge quickly to about 60° C. by increasing the rate of addition of water, agitating this slurry with an alkaline sulfite solution, and eliminating the sulfite solution from the screened crystals by washing with water.

7. A method of producing substantially pure trinitrotoluene, which comprises forming a mixture of crude molten trinitrotoluene and water, adding cold water until crystallization of the trinitrotoluene commences, regulating the addition of water so that the charge exhibits a slight increase in temperature, after crystallization is substantially complete shocking the crystals by cooling the charge quickly to about 60° C. by increasing the rate of addition of water, agitating this slurry with an alkaline sulfite solution, separating the unbroken aggregates from the individual crystals by screening, and eliminating the sulfite solution from the depelleted crystals by washing with water.

MAX C. KNAKE.